(12) United States Patent
Skorko (10) Patent No.: US 6,560,466 B1
(45) Date of Patent: May 6, 2003

(54) AUDITORY FEEDBACK CONTROL THROUGH USER DETECTION

(75) Inventor: James Skorko, Allentown, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/153,040

(22) Filed: Sep. 15, 1998

(51) Int. Cl.⁷ .............................. H04B 1/38; H04M 1/00
(52) U.S. Cl. .................... 455/567; 455/414; 455/550; 379/38
(58) Field of Search ................ 379/433, 388, 379/110.01, 102.02, 102.03, 38, 39, 51, 211.01, 211.02; 455/567, 414, 550, 458

(56) References Cited

U.S. PATENT DOCUMENTS

| | | | | |
|---|---|---|---|---|
| 4,254,303 A | * | 3/1981 | Takizawa ................. 455/245.1 |
| 4,385,452 A | * | 5/1983 | Deschaaf et al. .............. 34/53 |
| 4,480,154 A | * | 10/1984 | Klee ........................... 179/84 |
| 4,932,050 A | * | 6/1990 | Davidson et al. ....... 379/201.01 |
| 5,224,151 A | * | 6/1993 | Bowen et al. .............. 379/388 |
| 5,329,577 A | * | 7/1994 | Norimatsu .................. 455/567 |
| 5,337,353 A | * | 8/1994 | Boie et al. .................. 379/388 |
| 5,363,425 A | * | 11/1994 | Mufti et al. ................... 379/38 |
| 5,406,618 A | * | 4/1995 | Knuth et al. .................. 379/67 |
| 5,651,044 A | * | 7/1997 | Klotz, Jr. et al. ............ 378/117 |
| 5,729,604 A | * | 3/1998 | Van Schyndel ............. 379/388 |
| 5,735,605 A | * | 4/1998 | Blalock ...................... 374/179 |
| 5,778,061 A | * | 7/1998 | Parment et al. ............. 379/420 |
| 5,794,163 A | * | 8/1998 | Paterson et al. ............ 455/568 |
| 5,802,467 A | * | 9/1998 | Salazar et al. ......... 340/825.72 |
| 5,844,983 A | * | 12/1998 | Lilja ........................... 379/418 |
| 6,044,279 A | * | 3/2000 | Hokao et al. ................ 455/567 |
| 6,084,959 A | * | 7/2000 | Yun ........................... 379/375 |
| 6,122,366 A | * | 9/2000 | Veschi ........................ 379/376 |
| 6,346,891 B1 | * | 2/2002 | Feinleib et al. ............. 340/432 |

\* cited by examiner

*Primary Examiner*—Dwayne Bost
*Assistant Examiner*—Lewis G. West
(74) *Attorney, Agent, or Firm*—Dickstein Shapiro Morin & Oshinsky LLP (57) ABSTRACT

A wireless communication handset with a sensor and detection circuitry to detect user proximity to the handset is disclosed. The detection circuitry is connected to the control unit of the handset to implement ring volume control. When a user comes into close proximity of the sensor, the detection circuitry signals the control unit to lower the ring volume. Alternatively, the control unit will initiate an automatic answering service when the user comes into close proximity of the sensor.

40 Claims, 7 Drawing Sheets

AUDITORY FEEDBACK CONTROL THROUGH USER DETECTION

BACKGROUND OF THE INVENTION

1. Field of the Invention

This invention relates generally to the field of wireless communications and, more particularly, to auditory feedback control of a wireless telephone through user detection.

2. Description of the Related Art

Wireless communication devices such as cordless and cellular telephones have become increasing popular in both residential and commercial environments. Cordless telephones allow a user to maintain a conversation in a separate room from where the telephone is connected to the public switching telephone network (PSTN) central office. In addition, the use of cordless telephones allows a user to maintain a conversation while walking, cooking, typing, etc., without worrying about tangling or crimping a telephone cord. Likewise, cellular telephones allow a user to maintain a conversation while driving, for example, and give the user a very broad area to communicate from as opposed to being limited to the small area (usually a room, office or home) of a conventional telephone.

Although wireless communication devices provide the user with special freedoms and comforts unrealizable from wired communication devices, they do have some drawbacks. Users have the tendency to hold onto a wireless handset completion of a call or prior to the initiation of a call. When a handset rings under these situations, the user may become startled which in turn may cause the user to drop the handset. This may cause the handset to become inoperative. In addition, the ringing of the handset may cause damage to the user's hearing. These problems could be avoided if the ring volume of the handset were lowered when a user comes into close proximity of the handset.

Accordingly, there is a desire and need to adjust the ring volume of a wireless communication handset when a user comes into close proximity of the handset. In addition, sometimes it is desirable for an incoming call to be automatically forwarded to an answering service, particularly when the user is about to initiate a call. Accordingly, there is a desire and need to implement an automatic answering feature into a wireless communication device when a user comes into close proximity to the device's handset.

SUMMARY OF THE INVENTION

The present invention provides ring volume control for a wireless communication handset based upon the proximity of a user to the handset.

The present invention also provides an automatic answering mechanism for a wireless communication device based upon the proximity of a user to the handset.

The above and other features and advantages of the invention are achieved by providing a wireless communication handset with a sensor and detection circuitry to detect user proximity. The detection circuitry is connected to the control unit of the handset to implement ring volume control. When a user comes into close proximity of the sensor, the detection circuitry signals the control unit to lower the ring volume. Alternatively, the control unit will initiate an automatic answering service when the user comes into close proximity of the sensor.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

The present invention is suitable for use with any wireless communication device such as cordless, cellular and speaker telephones. The following description will be made with reference to a cordless phone for convenience purposes only and it must be noted that the invention is not to be limited solely to cordless telephones.

Figure 1:
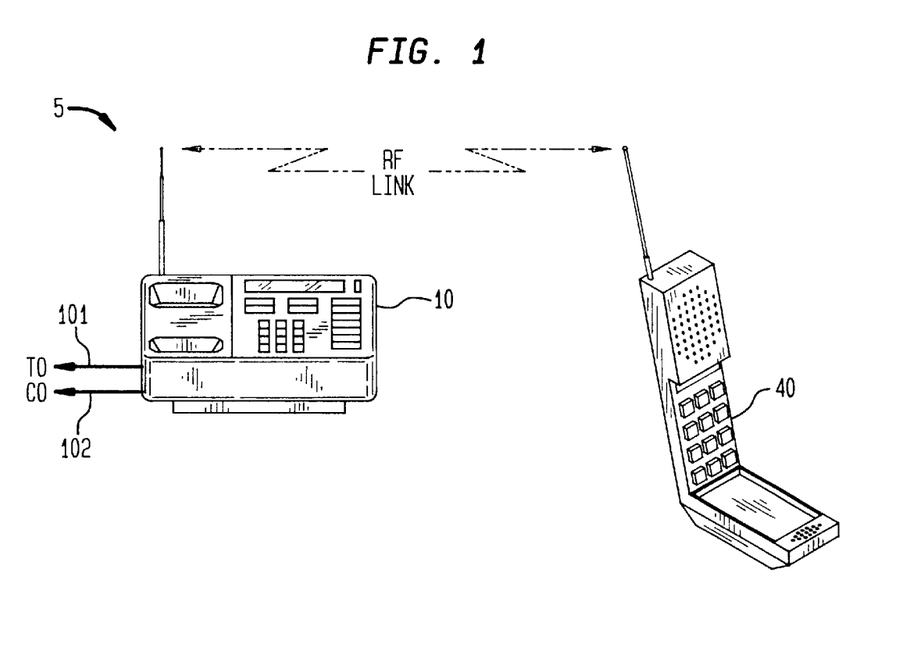
FIG. 1 illustrates a wireless communication device implementing a handset constructed in accordance with the present invention.

FIG. 1 illustrates a cordless telephone unit 5 including a base unit 10 and a handset 40 constructed in accordance with the present invention. The base unit 10 is connected to the PSTN central office through the tip and ring lines 101, 102 as is well known the art. The base unit 10 and the handset 40 communicate with each other through radio frequency (RF) signals. The operation and construction of cordless telephones is well known in the art and is described in, for example, U.S. Pat. Nos. 5,689,549 and 5,044,010 which are hereby incorporated by reference in their entirety.

Figure 2:
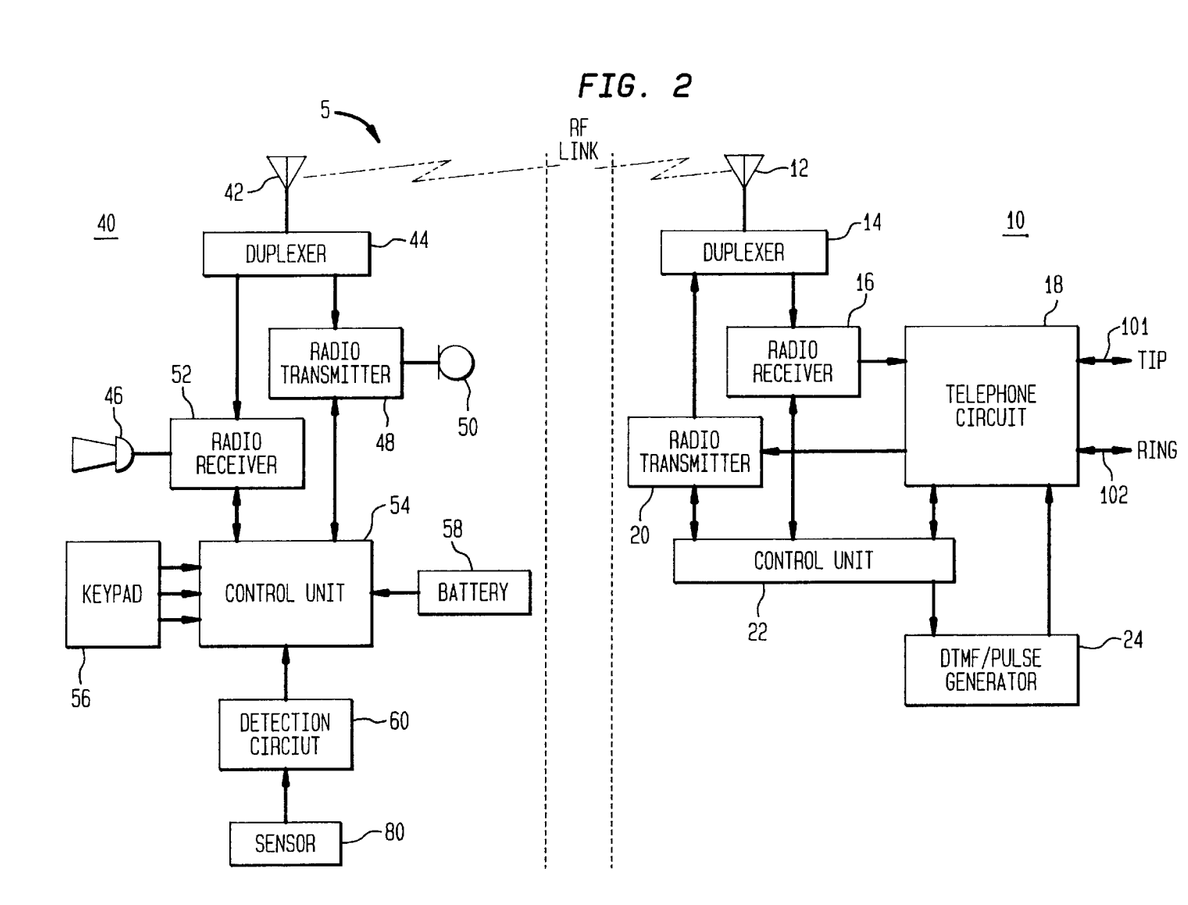
FIG. 2 illustrates a block diagram of the wireless communication device of FIG. 1.

FIG. 2 illustrates in block diagram form the cordless telephone unit 5 illustrated in FIG. 1. The base unit 10 is conventional and includes an antenna 12, duplexer 14, radio receiver 16, telephone circuit 18, radio transmitter 20, control unit 22 and a DTMF tone/pulse generator 24.

The antenna 12 is connected to the duplexer 14. The duplexer 14 allows the antenna 12 to receive and send signals. The duplexer 14 is also connected to the radio receiver 16 and transmitter 20. The control unit 22 is connected to the transmitter 20, receiver 16, telephone circuit 18 and the generator 24. The telephone circuit 18 serves as a plain old telephone service (POTS) interface for signals on the tip and ring lines 101, 102 and for those signals received by the receiver 16 or transmitted by the transmitter 20. The telephone circuit 18 is also connected to the tip and ring lines 101, 102, radio receiver 16, radio transmitter 20, control unit 22 and the generator 24. The generator 24 is configurable to either generate dual-tone-multiple frequency (DTMF) signals or pulse signals. The signals generated by the generator 24 are provided to the telephone circuit 18, in response to control signals from the control unit 54, which allows dialing over the tip and ring lines 101, 102 to connect the base unit 10 to the central office.

The handset 40 constructed in accordance with the present invention includes an antenna 42, duplexer 44, radio transmitter 48, radio receiver 52, control unit 54, keypad 56, battery 58, speaker 46, microphone 50, detection circuit 60 and a sensor 80. The antenna 42 is connected to the duplexer 44. The duplexer 44 allows the antenna 42 to both receive and send signals. The duplexer 44 is also connected to the radio transmitter 48 and receiver 52. The transmitter 48 is also connected to the microphone 50. The microphone 50 converts sound into electrical signals. The receiver 52 is also connected to the speaker 46. The speaker 46 converts electrical signals representing voice information and a telephone ring into sound.

The control unit 54 is connected to the transmitter 48, receiver 52, keypad 56, detection circuit 60 and the battery 58. The control unit 54 may be implemented through the use of hardware or a programmed microcomputer containing read-only memory (ROM) and random access memory (RAM). Preferably, the control unit 54 is a digital signal processor (DSP) with sufficient memory to store program instructions and any necessary data. It must be noted, however, that the architecture of the control unit 54 is not important as long as the control unit 54 is capable of performing the functions required to operate the telephone unit 5 incorporating the present invention as described in detail below.

As is known in the art, the control unit 54 stores requisite data required to initiate and maintain communications with the base unit 10. In addition, the control unit 54 will also configure the transmitter 48 and receiver 52 for operation. The transmitter 48 transmits signals to the base unit 10 with the control unit 54 providing the appropriate control information. The receiver 52 receives signals from the base unit 10 with the control unit 54 providing the appropriate control information. The battery 58 provides operating power for all of the circuitry in the handset 40. The keypad 56 is used for entering dial digits and control functions executable by the control unit 54 or to be transmitted to the base unit 10.

The detection circuit 60 is also connected to the sensor 80. As will be discussed below with reference to FIG. 3, the detection circuit 60 receives an input from the sensor 80 indicating that a user is holding or touching the handset 10. Upon receiving the sensor input, the detection circuit 60 converts the input into a user detection signal and transmits the signal to the control unit 54. The control unit 54 uses the user detection signal to either lower the ring volume of the handset 10, or initiate an automatic answering service to the central office or both dependent upon the configuration of the control unit 54.

Figure 3:
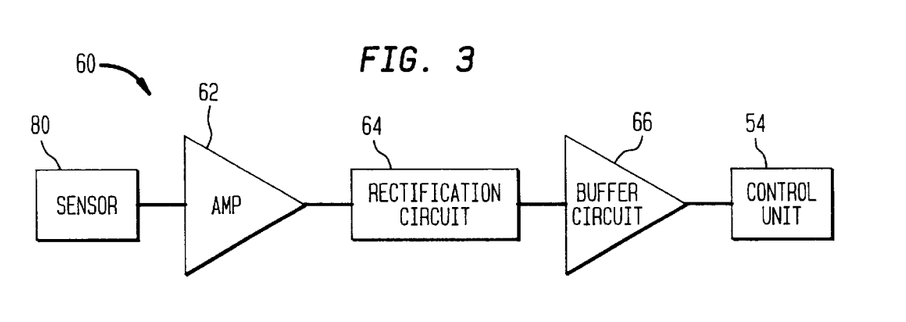
FIG. 3 illustrates an exemplary detection circuit used in the wireless communication device of FIG. 2.

FIG. 3 illustrates an exemplary embodiment of the detection circuit 60 10 constructed in accordance with the present invention. The circuit 60 includes a high impedance amplifier 62, a rectification and logic circuit 64 and a buffer circuit 66.

The sensor 80 is connected to the amplifier 62. The sensor 80 can be a metallic touch plate or a wire mesh or any other conductive material. In operation, stray 60 hz alternating current (AC) signals will be coupled onto the sensor 80 (e.g., touch plate) when a user touches the sensor 80. It is well known that stray 60 hz AC signals are resident in the air due to power dissipations. The high impedance of the amplifier 62 serves to detect and amplify the AC signal input from the sensor 80. Preferably, the amplifier 62 is a JFET amplifier which is known to be a high impedance device.

Once detected and amplified, the AC input signal is converted into a DC signal (hereinafter referred to as the "user detection signal") having a specified logic level (e.g., a logic one or zero) by the rectification and logic circuit 64. Thus, if the user touches the handset 40 the specified logic level is output from the rectification and logic circuit 64. The user detection signal is sent to the control unit 54 through the buffer circuit 66. The user detection signal will have, for example, a logic one value which when received by the control unit 54 will trigger the appropriate action. The rectification and logic circuit 64 can be any conventional device or circuitry capable of converting an AC signal into a DC signal.

The control unit 54 will be responsive to the receipt of the user detection signal from the detection circuit 60. As stated earlier, it is desirable for the control unit 54 to lower the ring volume of the handset 40 whenever a user is holding or touching the handset 40. Accordingly, in a first preferred embodiment, the control unit 54 will be configured to lower the ring volume of the handset 40 upon the receipt of the user detection signal from the detection circuit 60. Any subsequent ring signals received from the base unit 10 will be output to the speaker 46 at the reduced volume. The ring volume will remain at the reduced volume until the user detection signal is no longer present at the control unit 54. At which point, the control unit 54 returns the ring volume to the original volume.

Figure 4:
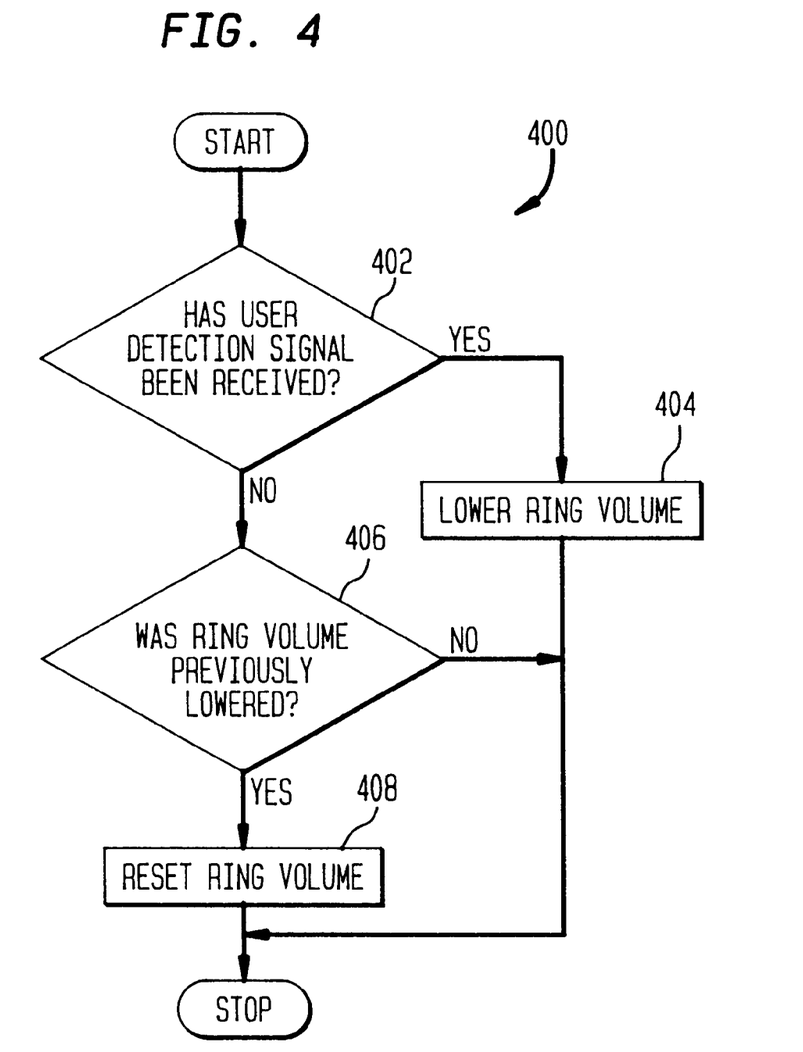
FIG. 4 illustrates the process of lowering the ring volume of the communication device of FIG. 2.

The processing 400 carried out by the control unit 54 to lower the ring volume is illustrated in FIG. 4. Initially, in step 402, the control unit 54 determines if the user detection signal has been received. If the signal has been received, the control unit lowers the ring volume (step 404). It the signal has not been received, the control unit 54 determines if the ring volume has been lowered previously (step 406). If the ring volume has been lowered, the control unit 54 resets the ring volume to the original volume (step 408). It must be noted that the control unit 54 may lower the ring volume for a predetermined number of rings, or a predetermined period of time, and then return the ring volume to its original volume even if the user is still holding onto the handset 40.

In another preferred embodiment, the control unit 54 will be configured to initiate an automatic answering service whenever a user is holding or touching the handset 40. In this embodiment, upon the receipt of the user detection signal from the detection circuit 60 and a ring signal from the base unit 10, the control unit 54 will issue commands to the PSTN central office. These commands will alert the central office to forward the incoming call to another phone number or an answering service. Techniques for issuing commands to the central office are known in the art. In addition, the control unit 54 may also allow one ring signal to be output through the speaker 46 at the reduced level to alert the user that an incoming call is being automatically answered.

Figure 5:
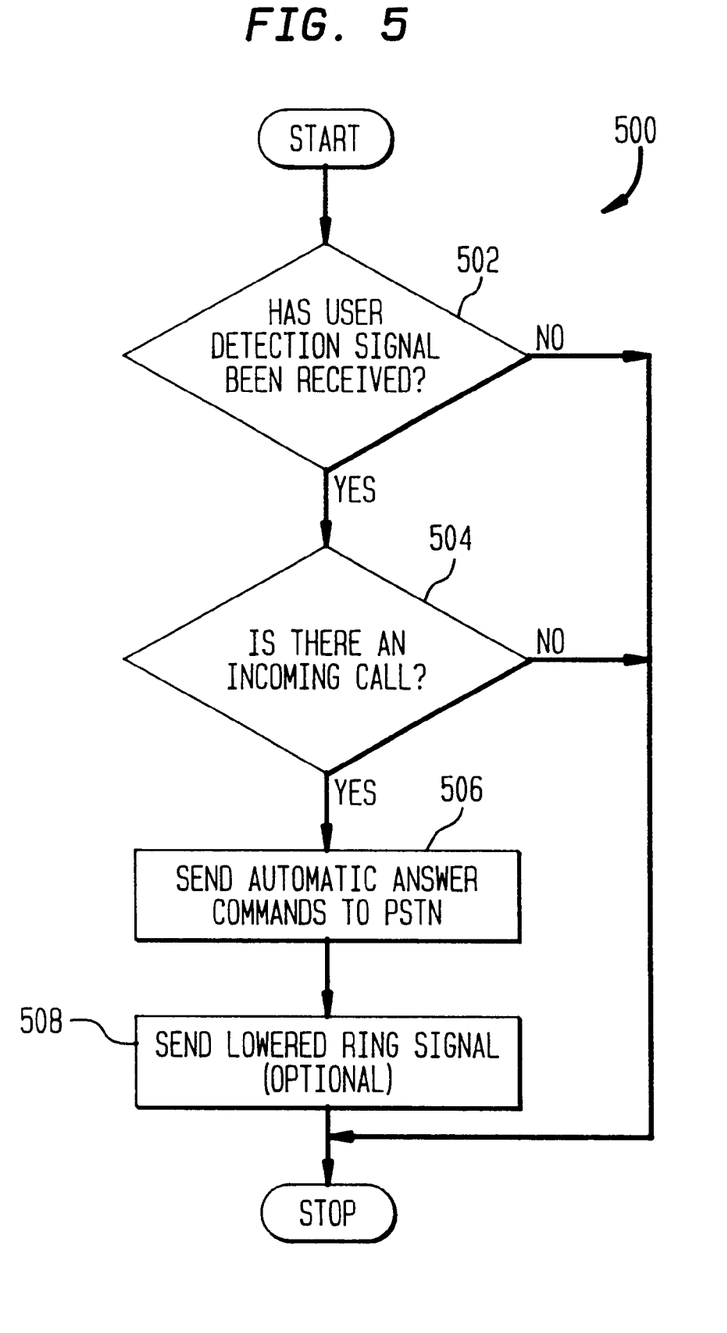
FIG. 5 illustrates the process of initiating an automatic answering service for the communication device of FIG. 2.

The processing 500 carried out by the control unit 54 to provide the automatic answering service commands to the central office is illustrated in FIG. 5. Initially, in step 502, the control unit 54 determines if the user detection signal has been received. If the signal has been received, the control unit determines if there is an incoming call (step 504). If there is an incoming call, the control unit 54 sends commands to the PSTN central office to initiate the automatic answering service (step 506). Optionally, the control unit 54 may also lower the ring volume (step 508). It the signal has not been received (step 502) or if there is no incoming call (504), the control unit 54 does not issue any commands to the PSTN and does not lower the ring volume. It must be noted that the control unit 54 may lower the ring volume for a predetermined number of rings, or a predetermined period of time, and then return the ring volume to its original volume even if the user is still holding onto the handset 40.

Figure 6:
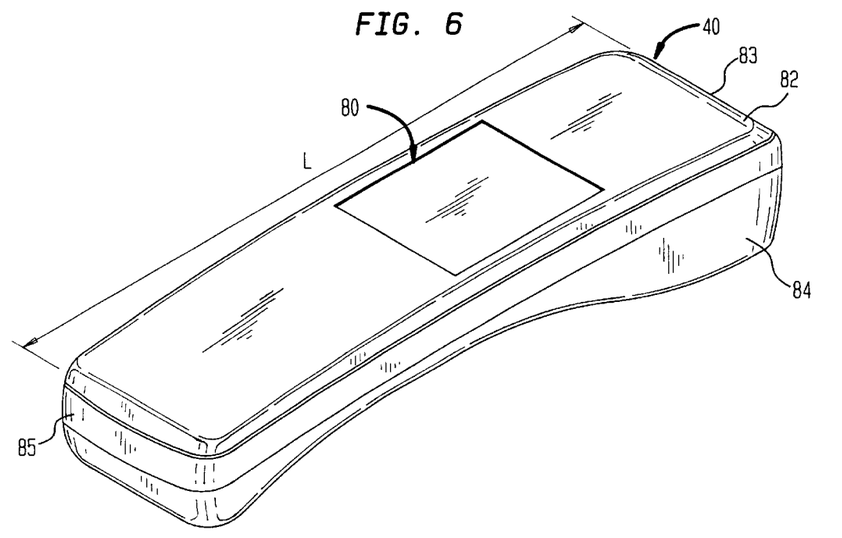
FIG. 6 illustrates a top perspective view of a wireless handset constructed in accordance with the present invention.
Figure 8:
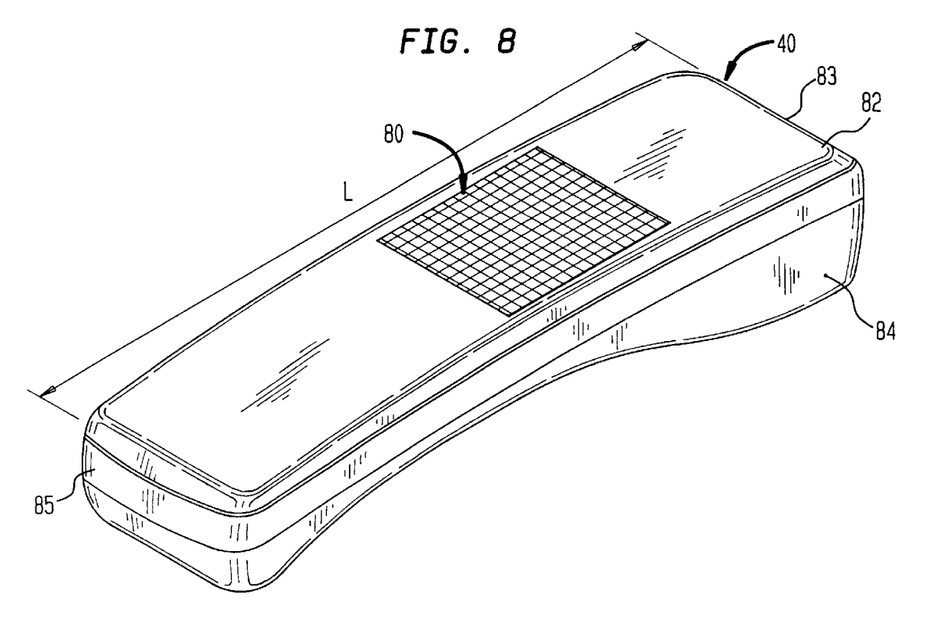
FIG. 8 illustrates a top perspective view of a wireless handset constructed in accordance with the present invention.

FIGS. 6 and 8 show a top perspective view of a handset 40 constructed in accordance with the present invention. The handset 40 includes an upper casing 82 and a lower casing 84. The upper casing 82 and the lower casing 84 are snapped, glued, screwed or combined together by any known technique. The two casings 82, 84 are made from non-conductive material such as plastic. The two casings 82, 84 house the circuitry of the handset 40 illustrated in FIG. 2 with the exception of the sensor 80, keypad (not shown) and a portion of the antenna 42 (not shown). FIG. 6 illustrates the use of a touch plate for the sensor 80 while FIG. 8 illustrates the use of a wire mesh as the sensor 80.

Figure 7:
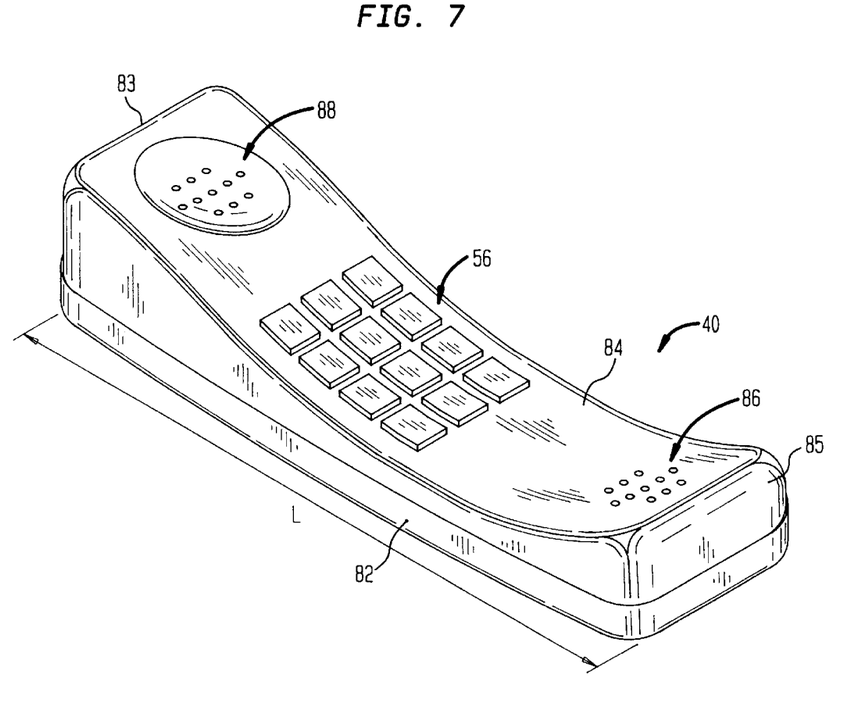
FIG. 7 illustrates a bottom perspective view of a wireless handset constructed in accordance with the present invention.

FIG. 7 shows a bottom perspective view of the handset 40 constructed in accordance with the present invention. The lower casing 84 contains an ear piece region 88, a mouth piece region 86 and a keypad 56. The speaker 46 (FIG. 2) is located below the ear piece region 88. The microphone 50 (FIG. 2) is located below the mouth piece region 86.

Referring again to FIG. 6, the handset 40 has first end 83 and a second end 85. The distance between the two ends 83, 85 is a length L. The sensor 80 is located on the upper casing 82. FIG. 4 illustrates that the sensor 80 is located approximately one-third the length L of the handset 40 from the first end 83. This is believed to be an optimal placement since most people have a tendency to hold a handset 40 at this point particularly when they are about to dial a telephone number. It must be noted, however, that the sensor 80 can be placed at any point along the upper or lower casing 82, 84. In addition, although FIG. 4 illustrates that the sensor 80 is square-shaped, it must be noted that the sensor 80 can be any shape or any size.

It must also be noted that the present invention can be modified in several ways. For example, the sensor 80 is not limited to touch plates or wire meshes. The sensor 80 can be a capacitive switch or other device that generates a signal upon being touched by a user. The sensor 80 is not limited to a touch actuated sensor. It can also be a proximity detector which does not require an actual touch for activation or a device that is triggered by other factors such as body heat or motion. The present invention could also be incorporated into other sound generating devices, such as a radio handset, where it would be desirable to adjust the sound based upon the proximity of a user to the device. The invention may also be used to control or actuate other telephone related functions, such as forwarding a call to a different phone number, based on the proximity of a user to the sensor 80.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by letters patent of the united states is:

1. A handset for use with a wireless communication device, said handset comprising:
    a sensor;
    a detection circuit connected to said sensor, said detection circuit generating a first signal when a user comes into close proximity to said sensor; and
    a control unit having said first signal as an input, said control unit initiating a transmission of a command to a telephone network from said handset responsive to an occurrence of said first signal, said command represents an instruction to forward the telephone call to an automatic answering service.

2. The handset of claim 1 wherein said control unit also lowers a ring volume of said communication device responsive to said first signal.

3. The handset of claim 2 wherein said control unit lowers the ring volume for a predetermined number of rings.

4. The handset of claim 1 wherein said sensor is a touch plate and said detection circuit generates said first signal when the user touches said touch plate.

5. The handset of claim 1 wherein said sensor is a wire mesh and said detection circuit generates said first signal when the user touches said wire mesh.

6. The handset of claim 1 wherein said sensor is a capacitive switch and said detection circuit generates said first signal when the user touches said capacitive switch.

7. The handset of claim 1 wherein said sensor is a proximity sensor and said detection circuit generates said first signal when the user is in close proximity to said sensor.

8. The handset of claim 1 wherein said detection circuit comprises:
    an amplifier connected to said sensor, said amplifier detecting and amplifying an output signal generated by said sensor;
    a rectification circuit connected to said amplifier, said rectification circuit converting said output signal of said amplifier into said first signal; and
    a buffer circuit for sending said first signal to said control unit.

9. The handset of claim 8 wherein said amplifier is a high impedance amplifier.

10. The handset of claim 8 wherein said amplifier is a JFET amplifier.

11. The handset of claim 1 wherein said control unit is a programmed digital signal processor.

12. The handset of claim 1 wherein said wireless communication device is a cordless telephone.

13. The handset of claim 1 wherein said wireless communication device is a cellular phone.

14. The handset of claim 1 wherein said wireless communication device is a radio handset.

15. A wireless communication system comprising:
    a base unit connected to a telephone network; and
    a handset communicating with said base unit, said handset comprising:
        a sensor;
        a detection circuit connected to said sensor, said detection circuit generating a first signal when a user comes into close proximity to said sensor; and
        a control unit having said first signal as an input, said control unit causing a predetermined operation of said communication system responsive to an occurrence of said first signal, wherein said predetermined operation is an instruction to initiate an automatic answering service to a public telephone network.

16. The system of claim 15 wherein said control unit also lowers a ring volume of said handset responsive to said first signal.

17. The system of claim 16 wherein said control unit lowers the ring volume for a predetermined number of rings.

18. The system of claim 15 wherein said sensor is a touch plate and said detection circuit generates said first signal when the user touches said touch plate.

19. The system of claim 15 wherein said sensor is a wire mesh and said detection circuit generates said first signal when the user touches said wire mesh.

20. The system of claim 15 wherein said sensor is a capacitive switch and said detection circuit generates said first signal when the user touches said capacitive switch.

21. The system of claim 15 wherein said sensor is a proximity sensor and said detection circuit generates said first signal when the user comes into close proximity of said sensor.

22. The system of claim 15 wherein said detection circuit comprises:
   an amplifier connected to said sensor, said amplifier detecting and amplifying an output signal generated by said sensor;
   a rectification circuit connected to said amplifier, said rectification circuit converting said output signal of said amplifier into said first signal; and
   a buffer circuit for sending said first signal to said control unit.

23. The system of claim 22 wherein said amplifier is a high impedance amplifier.

24. The system of claim 22 wherein said amplifier is a JFET amplifier.

25. The system of claim 15 wherein said control unit is a programmed digital signal processor.

26. A wired communication system comprising:
   a base unit connected to a telephone network;
   a handset connected to and communicating with said base unit;
   a sensor integrated with one of said base unit or said handset;
   a detection circuit connected to said sensor, said detection circuit generating a first signal when a user comes into close proximity to said sensor; and
   a control unit having said first signal as an input, said control unit initiating a transmission of a command to a telephone network from said handset responsive to an occurrence of said first signal, said command instructing the telephone network to forward a telephone call to an automatic answering service.

27. The system of claim 26 wherein said control unit also lowers a ring volume of said system responsive to said first signal.

28. The system of claim 27 wherein said control unit lowers the ring volume for a predetermined number of rings.

29. The system of claim 27 wherein said control unit lowers the ring volume for a predetermined period of time.

30. The system of claim 26 wherein said sensor is a touch plate and said detection circuit generates said first signal when the user touches said touch plate.

31. The system of claim 26 wherein said sensor is a wire mesh and said detection circuit generates said first signal when the user touches said wire mesh.

32. The system of claim 26 wherein said sensor is a capacitive switch and said detection circuit generates said first signal when the user touches said capacitive switch.

33. The system of claim 26 wherein said sensor is a proximity sensor and said detection circuit generates said first signal when the user comes into close proximity of said sensor.

34. The system of claim 26 wherein said detection circuit comprises:
   an amplifier connected to said sensor, said amplifier detecting and amplifying an output signal generated by said sensor;
   a rectification circuit connected to said amplifier, said rectification circuit converting said output signal of said amplifier into said first signal; and
   a buffer circuit for sending said first signal to said control unit.

35. A method for initiating an automatic answering service from a communication device, said method comprising:
   generating a detection signal when a user has come into close proximity of the device;
   detecting an incoming telephone call; and
   sending an automatic answering service command to a telephone network in response to said detection signal, wherein said command causes the telephone network to forward the telephone call to an answering service.

36. The method of claim 35 wherein said communication device includes a wireless handset, said method further comprising the step of lowering a ring volume of said handset.

37. The method of claim 35 wherein the generating step comprises the steps of:
   providing a touch plate on the device;
   detecting when the user has touched the touch plate; and
   generating the detection signal.

38. The method of claim 35 wherein the generating step comprises the steps of:
   providing a wire mesh on the device;
   detecting when the user has touched the wire mesh; and
   generating the detection signal.

39. The method of claim 35 wherein the generating step comprises the steps of:
   providing a capacitive switch on the device;
   detecting when the user has touched the capacitive switch; and
   generating the detection signal.

40. The method of claim 35 wherein the generating step comprises the steps of:
   providing a proximity sensor on the device;
   detecting when the user has come into close proximity to the sensor; and
   generating the detection signal.

* * * * *